United States Patent
Suh et al.

(10) Patent No.: US 11,851,079 B2
(45) Date of Patent: Dec. 26, 2023

(54) DEVICE FOR CLEANING A SENSOR OF A VEHICLE AND AN OPERATION METHOD THEREOF

(71) Applicants: HYUNDAI MOTOR COMPANY, Seoul (KR); KIA CORPORATION, Seoul (KR)

(72) Inventors: Jung Seok Suh, Yongin-si (KR); Hong Gyu Lee, Goyang-si (KR); Ja Yoon Goo, Anyang-si (KR); Hyung Ju Cha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/843,597

(22) Filed: Jun. 17, 2022

(65) Prior Publication Data
US 2023/0219589 A1    Jul. 13, 2023

(30) Foreign Application Priority Data
Jan. 11, 2022    (KR) .................. 10-2022-0004135

(51) Int. Cl.
*B60W 50/14*    (2020.01)
*B60Q 1/50*    (2006.01)
*B60S 1/56*    (2006.01)
*B60K 35/00*    (2006.01)

(52) U.S. Cl.
CPC ............ *B60W 50/14* (2013.01); *B60K 35/00* (2013.01); *B60Q 1/543* (2022.05); *B60S 1/56* (2013.01); *B60K 2370/111* (2019.05); *B60K 2370/161* (2019.05); *B60W 2050/146* (2013.01)

(58) Field of Classification Search
CPC . B60W 50/14; B60W 2050/146; B60K 35/00; B60K 2370/111; B60K 2370/161; B60Q 1/543; B60S 1/56
See application file for complete search history.

(56) References Cited

U.S. PATENT DOCUMENTS

| | | | | |
|---|---|---|---|---|
| 2006/0035578 | A1* | 2/2006 | Geiger | B60H 1/00785 454/139 |
| 2015/0138357 | A1* | 5/2015 | Romack | B60S 1/52 348/148 |
| 2018/0312141 | A1* | 11/2018 | Ghannam | B60S 1/56 |
| 2019/0248240 | A1* | 8/2019 | Fujita | B60K 35/00 |
| 2021/0197859 | A1* | 7/2021 | Canady | B60W 60/0015 |
| 2022/0153235 | A1* | 5/2022 | Sato | B60S 1/56 |

* cited by examiner

*Primary Examiner* — Omeed Alizada
(74) *Attorney, Agent, or Firm* — LEMPIA SUMMERFIELD KATZ LLC (57) ABSTRACT

A device and a method are provided for cleaning a vehicle sensor. The method, performed by the device of a vehicle, is for sensor cleaning management and includes determining whether to initiate sensor cleaning; providing first information on the sensor cleaning internally (e.g., to an occupant inside of the vehicle); and providing second information on the sensor cleaning externally (e.g., to a person outside of the vehicle).

20 Claims, 9 Drawing Sheets

DEVICE FOR CLEANING A SENSOR OF A VEHICLE AND AN OPERATION METHOD THEREOF

CROSS-REFERENCE TO RELATED APPLICATIONS

This application is based on and claims priority to Korean Patent Application Number 10-2022-0004135, filed Jan. 11, 2022, the disclosure of which is incorporated by reference herein in its entirety.

TECHNICAL FIELD

The present disclosure relates to a device and a method for cleaning sensors of a vehicle.

BACKGROUND

The statements in this section merely provide background information related to the present disclosure and do not necessarily constitute prior art.

To detect the environment around a vehicle during driving assist or autonomous driving, various sensors are used such as an image sensor, a lidar, a radar, and an ultrasonic sensor. Since these sensors are generally installed facing externally (e.g., toward the outside of the vehicle), they are susceptible to contamination by elements such as dust or water droplets. This results in deteriorated detection performance of the sensors.

As preventive measures, sensor cleaning technologies have been developed to remove foreign matters adhering to the sensors by ejecting washer fluid or air thereto. However, according to existing technologies, washer fluid or wastes may be scattered and splashed on pedestrians around the vehicle, and the vehicle interior may also suffer from the ingress of the washer fluid, wastes, odors, and/or noise.

SUMMARY

According to at least one embodiment, the present disclosure provides a method, performed by a device of a vehicle, for sensor cleaning management. The method includes: determining whether to initiate sensor cleaning; providing first information on the sensor cleaning internally (e.g., to an occupant inside of the vehicle); and providing second information on the sensor cleaning externally (e.g., to a person outside of the vehicle).

According to another embodiment, the present disclosure provides a device for sensor cleaning management. The device includes a control unit configured to determine whether to initiate sensor cleaning, to provide the first information on the sensor cleaning internally (e.g., to an occupant inside of the vehicle), and to provide the second information on the sensor cleaning externally (e.g., to a person outside of the vehicle).

According to yet another embodiment, the present disclosure provides a vehicle, including at least one or more sensors. The vehicle includes: a cleaning unit configured to eject at least one of washer fluid and air toward the sensor; a control unit configured to determine whether to initiate sensor cleaning by the cleaning unit; an internal Human Machine Interface (HMI) unit configured to provide the first information on the sensor cleaning internally (e.g., to an occupant inside of the vehicle); and an external HMI unit configured to provide the second information on the sensor cleaning externally (e.g., to a person outside of the vehicle).

DETAILED DESCRIPTION

The present disclosure in some embodiments seeks to provide a device for cleaning a sensor of a vehicle. The device operates before or during a sensor cleaning process and thus alerts the occupants and/or pedestrians with a message informing them of the sensor cleaning provided internally (e.g., to an occupant inside of the vehicle) and/or externally (e.g., to a person outside of the vehicle). The present disclosure in some embodiments also seeks to provide a method of operating the same device.

The present disclosure in yet other embodiments seeks to provide a device for cleaning a sensor of a vehicle. The device operates before or during a sensor cleaning process to control a ventilation mode of the vehicle, a window, and/or a door operation and thus prevents washer fluid, foreign matters, odors and/or noise, etc. from intruding into the vehicle. The present disclosure in other embodiments also seeks to provide a method of operating the same device.

The present disclosure in yet another embodiment seeks to provide a device for cleaning a sensor of a vehicle. The device can be responsive to an environment external to the vehicle that is unsuitable to perform sensor cleaning in order to stop the sensor cleaning. The present disclosure in another embodiment seeks to provide a method of operating the same device.

The objects of the present disclosure are not limited to those particularly described hereinabove. The above and other objects that the present disclosure could achieve should be clearly understood by those having ordinary skill in the art from the following detailed description.

Hereinafter, some embodiments of the present disclosure are described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity.

In describing the components of the embodiments, alphanumeric codes may be used such as first, second, i), ii), a), b), etc., solely for the purpose of differentiating one component from others. These alphanumeric codes are not intended to imply or suggest the substances, the order, or sequence of the components. Throughout this specification, when parts "include" or "comprise" a component, they are meant to further include other components, not to exclude other components unless there is a particular description contrary thereto.

The description of the present disclosure to be presented below in conjunction with the accompanying drawings is intended to describe embodiments of the present disclosure and is not intended to represent the only embodiments in which the technical idea of the present disclosure may be practiced. When a component, device, element, or the like of the present disclosure is described as having a purpose or performing an operation, function, or the like, the component, device, or element should be considered herein as being "configured to" meet that purpose or to perform that operation or function. The present disclosure describes various sensor and sensor management components of a vehicle as devices, apparatuses, or units. Such components may include a cleaning unit, an internal Human Machine Interface (HMI) unit, an external HMI unit, a driving unit, a control unit, an input unit, a first display unit, a first sound output unit, a second display unit, a second sound output unit, an air-conditioner driving unit, a window driving unit, and a door driving unit. Each of these units, as well as other units, may separately embody or be included with a processor and a memory, such as a non-transitory computer readable media, as part of the device, apparatus, or unit.

Figure 1:
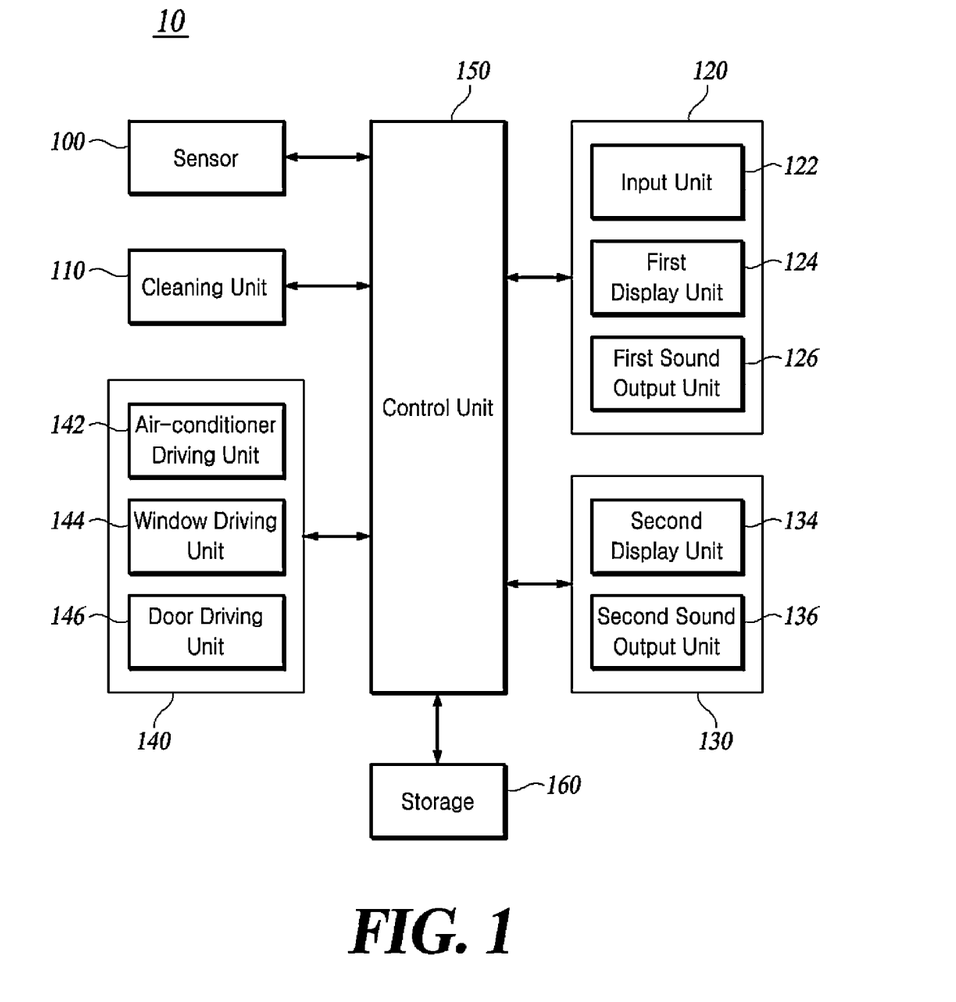
FIG. 1 is a block diagram illustrating components of a vehicle according to at least one embodiment of the present disclosure.

FIG. 1 is a block diagram illustrating components of a vehicle according to at least one embodiment of the present disclosure.

As shown in FIG. 1, the vehicle 10 may include a sensor 100, a cleaning unit 110, an internal Human Machine Interface (HMI) unit 120, an external HMI unit 130, a driving unit 140, a control unit 150, and a storage 160 in whole or in part. The components may each be a device or a logic element installed in the vehicle 10, which may mean a unit that processes at least one function or operation and may be implemented as hardware or software or hardware and software combined. Not all blocks shown in FIG. 1 are requisite components, and some blocks included in the vehicle 10 may be added, changed, or deleted in other embodiments.

The respective components may exchange signals via an internal communication system (not shown). The signals may include data. The internal communication system may use at least one communication protocol, e.g., CAN, LIN, FlexRay, MOST, or Ethernet.

A sensor cleaning management device according to at least one embodiment of the present disclosure includes one or more devices and logic elements installed in the vehicle 10. For example, the sensor cleaning management device includes the control unit 150 and the storage 160. In another embodiment, the sensor cleaning management device further includes any one or more of the cleaning unit 110, the internal HMI unit 120, the external HMI unit 130, and/or the driving unit 140.

The sensor 100 may be configured to recognize the surrounding situation of the vehicle 10. The vehicle 10 may include at least one or more sensors 100. For example, the sensor(s) 100 may be, but is not limited to, any one of an image sensor, a radar, a lidar, and/or an ultrasonic sensor. The sensor(s) 100 may be implemented as other types of sensor as long as they can be applied to the vehicle 10.

The cleaning unit 110 may be configured to eject washer fluid and/or air toward the sensor 100. For example, the cleaning unit 110 may be configured to eject the washer liquid and air at the same time or at different times toward the sensor 100 depending on the situation and purpose and thus may remove pollutants attached to the sensor 100. However, the cleaning unit 110 may eject fluid, which is not necessarily limited to washer fluid and air.

Figure 2:
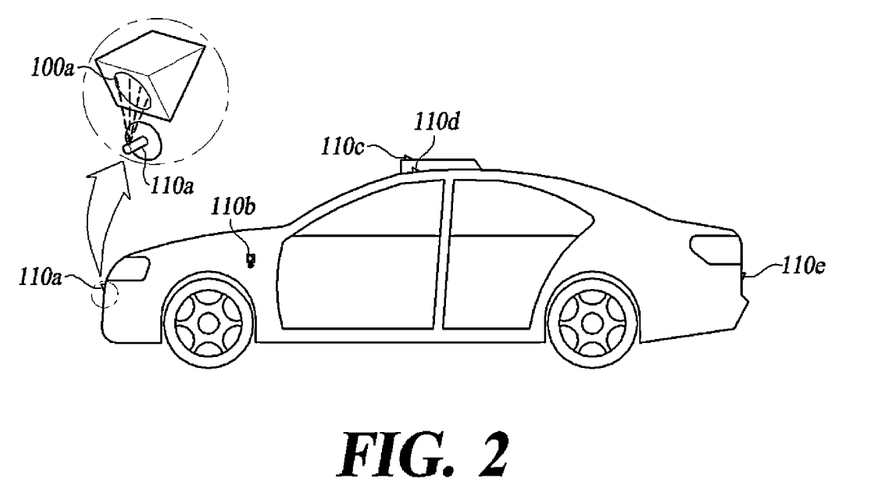
FIG. 2 illustrates a cleaning unit according to at least one embodiment of the present disclosure.

FIG. 2 illustrates a cleaning unit according to at least one embodiment of the present disclosure.

As shown in FIG. 2, the vehicle 10 according to at least one embodiment of the present disclosure may include at least one or more cleaning units 110a, 110b, 110c, 110d and 110e. For example, a plurality of cleaning units 110a, 110b, 110c, 110d and 110e may be disposed to be spaced apart from each other on the outside of the vehicle 10. Meanwhile, although the present disclosure is not so limited, FIG. 2 illustrates one cleaning unit 110a configured to eject washer liquid and/or air toward one predetermined sensor 100a. Each cleaning unit 110a, 110b, 110c, 110d and 110e may be controlled to eject washer fluid and/or air toward any one or more of the plurality of sensors. For example, the cleaning unit 110a, 110b, 110c, 110d and 110e may be rotated and/or tilted in response to a control command of the control unit 150.

The internal HMI unit 120 is an HMI (Human Machine Interface) between the vehicle 10 and the occupant, and it may include all or some of the input unit 122, the first display unit 124, and the first sound output unit 126.

Figure 3:
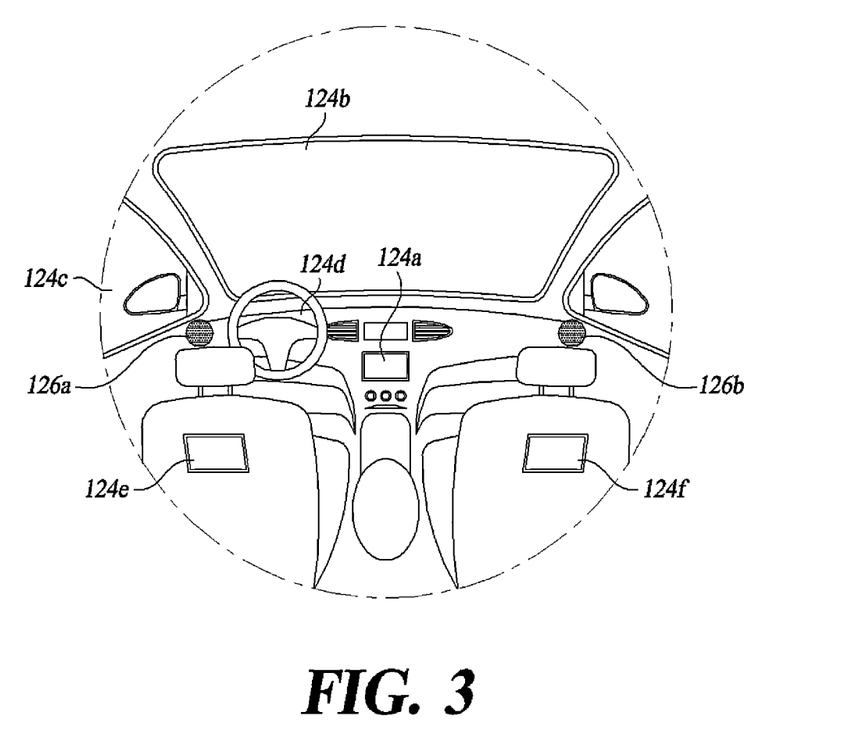
FIG. 3 illustrates an internal Human Machine Interface (HMI) unit according to at least one embodiment of the present disclosure.

FIG. 3 illustrates the internal HMI unit according to at least one embodiment of the present disclosure.

The input unit 122 may be configured to receive an input from the occupant for setting or changing predetermined values of various functions. For example, the input unit 122 may be configured to receive, from the occupant, a sensor cleaning start or stop request for the specific sensor 100. The vehicle 10 may include at least one input unit 122. At least one input unit 122 may be implemented as at least one of a physical button, a touch panel, and/or a microphone. The input unit 122 may be combined with the first display unit 124 to be implemented as a touch display or the like.

The first display unit 124 may be configured to provide information about the vehicle 10 to the occupant by using a graphic user interface (GUI). The vehicle 10 may include at least one first display unit 124. As shown in FIG. 3, at least one first display unit 124 may be implemented by, but is not limited to, a display 124a of an audio-video navigation (AVN) device, a windshield display 124b, a window display 124c, a cluster 124d, and/or display units 124e and 124f disposed on seats or some areas of the vehicle 10.

The first sound output unit 126 may be configured to provide information on the vehicle 10 to the occupant by using an Auditory User Interface (AUI). The vehicle may have at least one first sound output unit 126. As shown in FIG. 3, the one or more first sound output units 126 may be, but are not limited to, speakers 126a and 126b for outputting a voice and/or an alarm sound internally (e.g., to an occupant inside of the vehicle), and other methods may also be implemented as long as they can output the sound internally (e.g., to an occupant inside of the vehicle 10).

The external HMI unit 130 is an HMI between the vehicle 10 and the pedestrian and may include all or some of a second display unit 134 and a second sound output unit 136.

Figure 4:
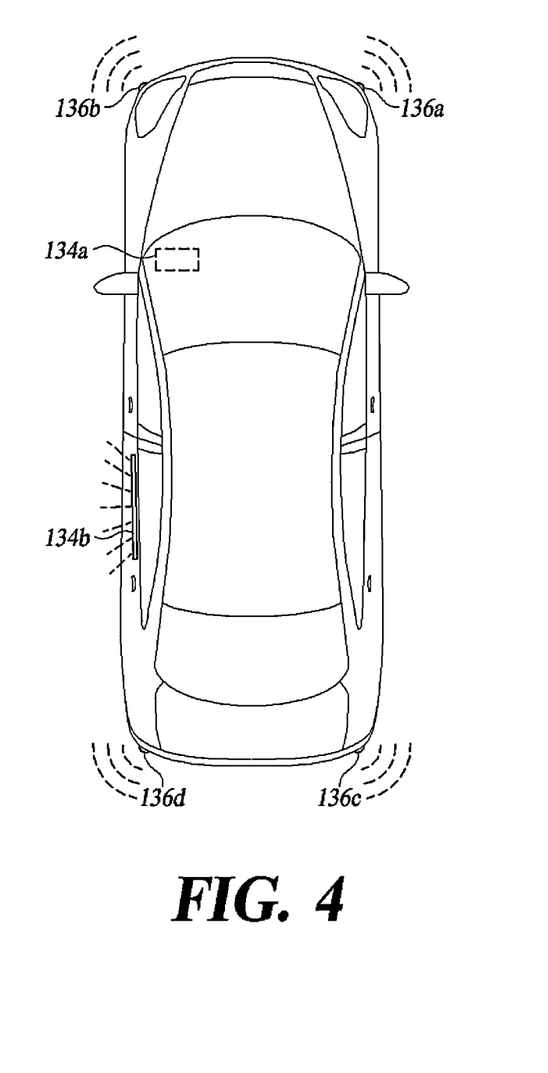
FIG. 4 illustrates an external HMI unit according to at least one embodiment of the present disclosure.

FIG. 4 illustrates the external HMI unit according to at least one embodiment of the present disclosure.

The second display unit 134 may be configured to provide information about the vehicle 10 to the pedestrian by using the GUI. The vehicle 10 may include at least one or more second display units 134. As shown in FIG. 4, the at least one second display unit 134 may be, but is not limited to, any one of a windshield display 134*a*, an LED strip 134*b*, and the like. The at least one second display unit 134 may also be implemented in other ways as long as information can be displayed externally (e.g., to a person outside of the vehicle 10). For example, the at least one second display unit 134 may be any one of a window display, a display disposed on the body of the vehicle 10, and/or an illuminating lamp for outputting information of the vehicle 10 toward the road surface.

The second sound output unit 136 may be configured to provide information on the vehicle 10 to the pedestrian by using the AUI. The vehicle 10 may include at least one second sound output unit 136. As shown in FIG. 4, the one or more second sound output units 136 may be implemented as, but are not limited to, speakers 136*a* to 136*d* for outputting a voice and/or an alarm sound externally (e.g., to a person outside of the vehicle), and other methods may also be implemented as long as they can output the sound externally (e.g., to a person outside of the vehicle 10). Meanwhile, FIG. 4 illustrates the plurality of speakers 136*a*, 136*b*, 136*c*, and 136*d* as being disposed to face the front left, front right, rear left, and rear right of the vehicle 10, although the present disclosure may have unlimited numbers and arrangements of the speakers.

The driving unit 140 may be configured to control the operation of various devices mounted on the vehicle 10. For example, the driving unit 140 may include all or some of an air-conditioner driving unit 142, a window driving unit 144, a door driving unit 146, and the like.

The air-conditioner driving unit 142 may be configured to control the air conditioning device of the vehicle 10. For example, the air-conditioner driving unit 142 may be configured to convert the ventilation mode of the vehicle 10 into a recirculation mode or a fresh air mode. Here, the recirculation mode may be referred to as "RECIRC.," "inside air mode," "inside air circulation mode," or other terms having equivalent technical meanings. The fresh air mode may be referred to as "outside air mode," "outside air circulation mode," or other terms having equivalent technical meanings.

The window driving unit 144 may be configured to control at least one window of the vehicle 10. For example, the window driving unit 144 may be configured to control the opening or closing of at least one window of the vehicle 10.

The door driving unit 146 may be configured to control at least one door of the vehicle 10. For example, door driving unit 146 may be configured to control the locking or unlocking of at least one door of the vehicle 10.

The driving unit 140 may be configured to operate following a request from an occupant and/or a control command of the control unit 150. Depending on some embodiments, the driving unit 140 may include one or more processors. Depending on some embodiments, the components of the driving unit 140 each include an individual processor. Meanwhile, the present application does not reiterate the method of controlling, by the driving unit 140, the operation of various units and devices mounted on the vehicle 10 because the method is commonly known in this technical field.

The control unit 150 may be configured to interwork with the sensor 100, cleaning unit 110, internal HMI unit 120, external HMI unit 130, driving unit 140, and/or the storage 160 to perform calculations and controls related to sensor cleaning. The control unit 150 may be implemented as one or more processors. For example, the control unit 150 may be implemented as an electronic control unit (ECU), microcontroller unit (MCU), or another sub-controller mounted on a vehicle.

The control unit 150 may be configured to detect contamination of the sensor 100 based on data obtained from the sensor 100. For example, the control unit 150 may be configured to detect contamination of the sensor 100 based on an offset existing in the data. As another example, the control unit 150 may be configured to detect contamination of any one or more of the sensors 100 by comparing data of the sensors 100 that have Field Of Views (FOVs) overlapping at least partially. As another example, the control unit 150 may be configured to detect contamination of the sensor 100 by using data of a contamination detection sensor (not shown) disposed about that sensor 100.

According to some embodiments, the control unit 150 be configured to determine the contamination degree of the sensor 100. Contamination degree according to at least one embodiment of the present disclosure may be classified into 'good', 'caution', and 'unsafe'. The contamination degree may be classified based on the ratio of the contaminated area to the overall FOV (Field Of View) of the sensor 100 and the period of exposure thereof to the contamination. Additionally, the control unit 150 may be configured to classify, based on various information, the contamination degree of the sensor 100 into two or more categories. According to some embodiments, the control unit 150 may be configured to calculate and generate the current contamination degree of the sensor 100 as a ratio based on a comparison with data obtained right after cleaning the sensor 100 or a preset initial value.

Meanwhile, the present application does not particularly reiterate the method performed by the control unit 150 for detecting the contamination of the sensor 100 or determining the contamination degree by using the data of the sensor 100 because the method is commonly known in this technical field. The present disclosure does not particularly limit the method of detecting or determining the contamination degree to particular implementations.

The control unit 150 may be configured to control the internal HMI unit 120 to provide information on whether or not the sensor 100 is contaminated or the contamination degree internally (e.g., to an occupant inside of the vehicle 10). For example, the control unit 150 may control the first display unit 124 to output a screen conveying information on whether the sensor 100 is contaminated or the contamination degree. As another example, the control unit 150 may control the first sound output unit 126 to provide a voice conveying information on whether the sensor 100 is contaminated or the contamination degree or output an alarm sound warning that the contamination degree of at least one sensor 100 is greater than or equal to a preset threshold.

Figure 5:
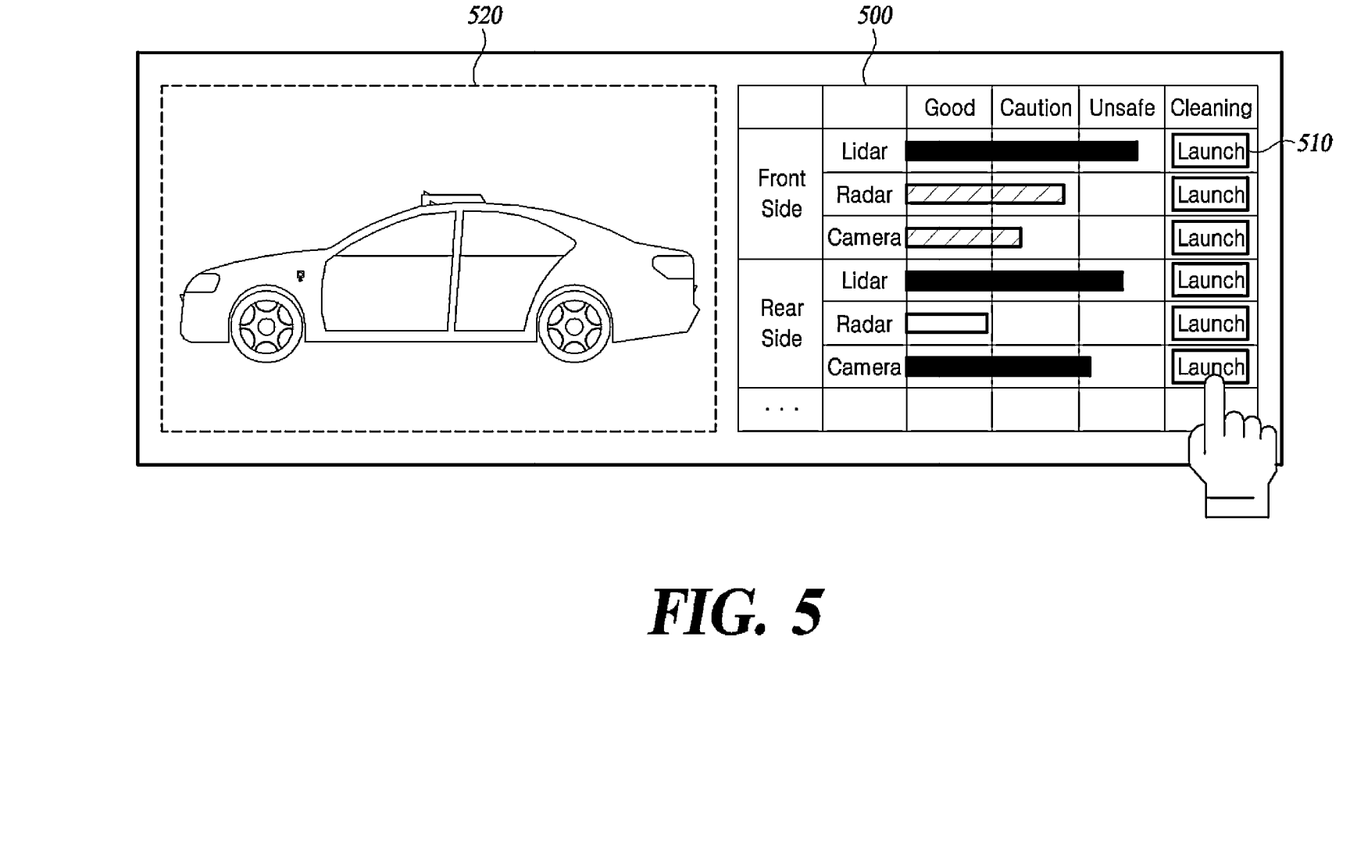
FIG. 5 is a diagram illustrating a method of providing information on contamination of sensors internally (e.g., to an occupant inside of a vehicle) according to at least one embodiment of the present disclosure.

FIG. 5 is a diagram illustrating a method of providing information on contamination of sensors internally (e.g., to an occupant inside of a vehicle), according to at least one embodiment of the present disclosure.

As shown in FIG. 5, a screen conveying information on the presence or absence of contamination or a contamination degree may include a first graphic object 500 indicating the contamination degree of at least one or more sensors 100. The first graphic object 500 may further include information on the types of the respective sensors 100 (e.g., lidar, radar, and camera, etc.) and placement positions (e.g., front and rear, etc.). According to some embodiments, the first graphic object 500 may group and list the sensors 100 based on their type and/or placement position. According to some embodiments, the display of the first graphic object 500 may be reformed according to the contamination degree of the respective sensors 100.

The screen conveying information on the presence or absence of contamination or the degree of contamination may include at least one second graphic object 510 each read as "Launch" for receiving a sensor cleaning start command for each sensor 100. Based on a touch applied to the second graphic object 510 corresponding to the specific sensor 100, the control unit 150 may determine to initiate sensor cleaning of that sensor 100.

The screen conveying information on the presence or absence of contamination or the degree of contamination may include a third graphic object 520 indicating the location of the sensor 100.

According to some embodiments, the control unit 150 may be configured to determine whether to initiate sensor cleaning based on the contamination degree of each sensor 100. The control unit 150 may be configured to determine that the sensor cleaning be initiated when the contamination degree of at least a preset number of sensors 100 is equal to or greater than a preset threshold. For example, when there are two or more sensors 100 classified as 'unsafe', the control unit 150 may determine to initiate sensor cleaning.

According to some embodiments, the control unit 150 may be configured to initiate sensor cleaning only when no pedestrian is detected outside of the vehicle 10. Meanwhile, when a pedestrian is detected after determining that sensor cleaning is to be initiated, the control unit 150 may be configured to determine to stop sensor cleaning.

To this end, the control unit 150 may be configured to detect a pedestrian based on data obtained from the sensor 100. In at least one embodiment, the control unit 150 may be configured to detects a pedestrian by using uncontaminated ones among the plurality of sensors 100. In another embodiment, the control unit 150 may be configured to utilize a plurality of sensors 100, while assigning weights according to the contamination degree of each sensor 100. In yet another embodiment, the control unit 150 may be configured to utilize data from a pedestrian detection sensor (not shown). For example, the control unit 150 and may use a pedestrian detection sensor mounted inside the vehicle 10 for detecting a pedestrian outside of the vehicle 10.

The present application does not particularly reiterate the method performed by the control unit 150 for detecting a pedestrian by using the data of the sensor 100 because the method is commonly known in this technical field. The present disclosure does not particularly limit the method of detecting a pedestrian to particular implementations.

In response to determining to initiate sensor cleaning, the control unit 150 may be configured to control at least one of a ventilation mode, a window operation, and/or a door operation of the vehicle 10. For example, the control unit 150 may be configured to control the air-conditioner drive unit 142 to switch the ventilation mode of the vehicle 10 to the recirculation mode. As another example, the control unit 150 may be configured to control the window driving unit 144 to close at least one window of the vehicle. This can prevent the fluid, odors, and/or foreign substances from being introduced into the vehicle 10. As another example, the control unit 150 may be configured to control the door driving unit 146 to lock at least one door of the vehicle. This can prevent the occupant from getting off the vehicle and coming into contact with the fluid and/or foreign substances while the sensor cleaning is being performed.

In response to completion of the sensor cleaning, the control unit 150 may be configured to control at least one of the ventilation mode, one or more windows, and/or one or more doors to return to the state before the sensor cleaning.

The control unit 150 may be configured to control the first information on sensor cleaning to be provided internally (e.g., to an occupant inside of the vehicle 10). For example, the control unit 150 may be configured to control the first display unit 124 to output a screen conveying the first information on sensor cleaning. As another example, the control unit 150 may be configured to control the first sound output unit 126 to output a voice or an alarm sound conveying the first information on sensor cleaning. Here, the first information on the sensor cleaning may convey any one or more of a message indicating that sensor cleaning is scheduled to begin, a message indicating that sensor cleaning is to be stopped, a message indicating that sensor cleaning will be resumed after a preset time, a message indicating that a pedestrian is outside the vehicle, and/or a message informing that at least one of a ventilation mode, one or more windows, and/or one or more door of the vehicle is controlled or reinstated.

Figure 6:
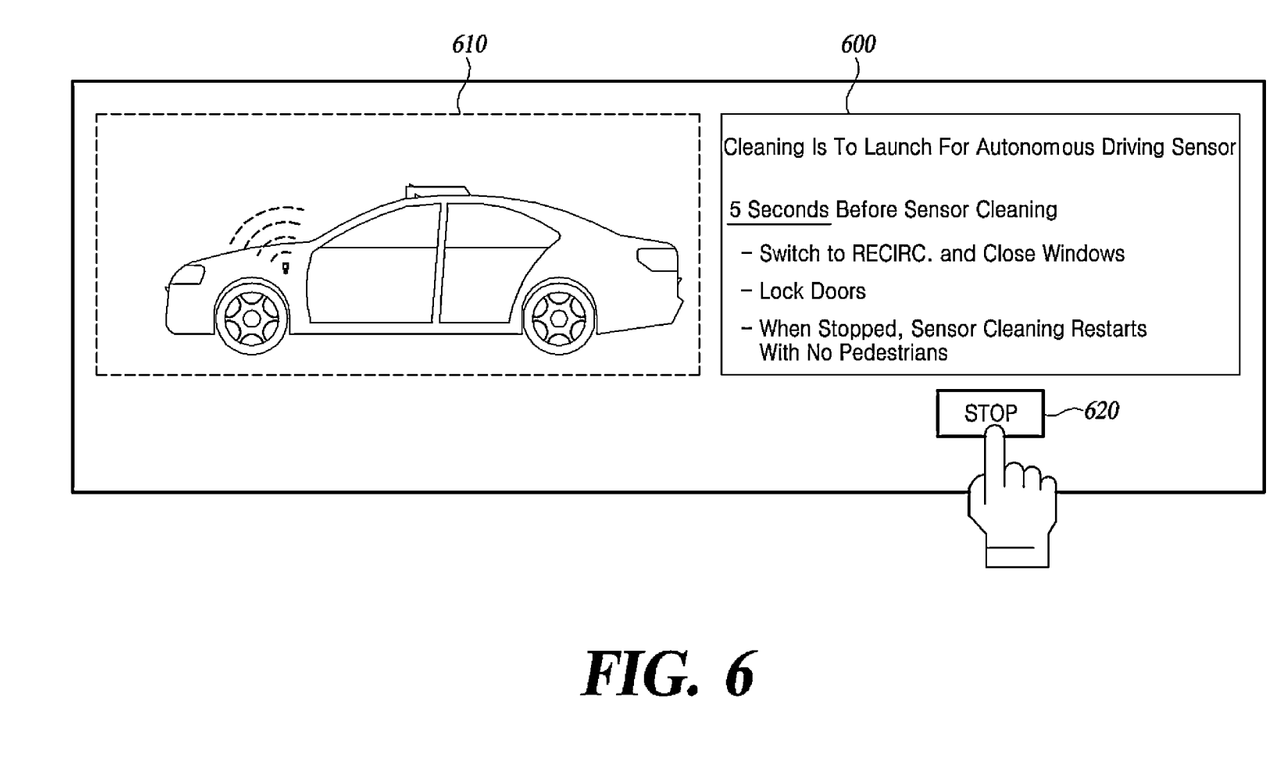
FIG. 6 is a diagram illustrating a method of providing information on sensor cleaning internally (e.g., to an occupant inside of a vehicle) according to at least one embodiment of the present disclosure.

FIG. 6 is a diagram illustrating a method of providing information on sensor cleaning internally (e.g., to an occupant inside of a vehicle), according to at least one embodiment of the present disclosure.

As shown in FIG. 6, a screen conveying the first information on sensor cleaning may include a fourth graphic object 600 of messages generated by textualizing or imaging for indicating that sensor cleaning is to be initiated. According to some embodiments, the fourth graphic object 600 may include a textualized or imaged message informing an occupant of a time to initiate sensor cleaning and/or textualized or imaged messages informing the occupant of controlling of at least one of a ventilation mode, window operation, and/or door operation of the vehicle.

The screen conveying the first information on the sensor cleaning may include a fifth graphic object 610 related to the sensor 100 to undergo the sensor cleaning. As an example, the fifth graphic object 610 may include an image representing the position of the sensor 100 to undergo sensor cleaning. As another example, the fifth graphic object 610 may include a captured image in a direction corresponding to the sensor 100 in which the sensor cleaning is to be performed.

The screen conveying the first information on sensor cleaning may include a sixth graphic object 620 for receiving a sensor cleaning stop command for one or more sensors 100. Based on a touch applied to the sixth graphic object 620, the control unit 150 may be configured to determine to stop sensor cleaning of the one or more sensors 100. For example, in response to a touch being applied to the sixth graphic object 620, the control unit 150 may be configured to stop the sensor cleaning.

Figure 7:
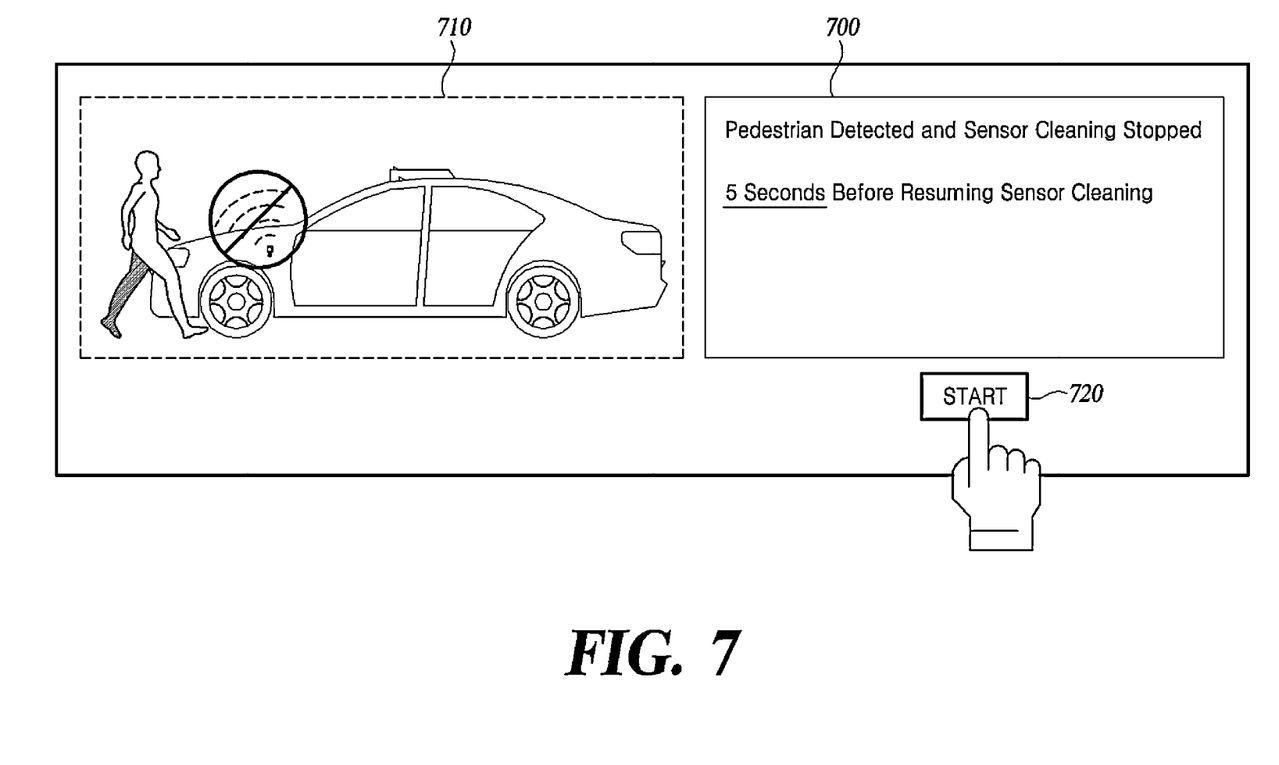
FIG. 7 is a diagram illustrating a method of providing information on sensor cleaning internally (e.g., to an occupant inside of a vehicle) according to another embodiment of the present disclosure.

FIG. 7 is a diagram illustrating a method of providing information on sensor cleaning internally (e.g., to an occupant inside of a vehicle), according to another embodiment of the present disclosure.

As shown in FIG. 7, a screen conveying the first information on sensor cleaning may include a seventh graphic object 700 of messages generated by textualizing or imaging for indicating that sensor cleaning is stopped. According to some embodiments, the seventh graphic object 700 may include a textualized or imaged message informing the occupant of the time to resume sensor cleaning.

The screen conveying the first information on sensor cleaning may include an eighth graphic object 710 related to pedestrian detection. As an example, the eighth graphic object 710 may include images representing the position of the sensor 100 to be cleaned and a direction in which a pedestrian is detected. As another example, the eighth graphic object 710 may include a captured image in a direction corresponding to the sensor 100 in which the sensor cleaning is to be performed and/or a captured image in a direction in which a pedestrian is detected.

The screen conveying the first information on sensor cleaning may include a ninth graphic object 720 for receiving a sensor cleaning resume command for one or more sensors 100. The control unit 150 may be configured to determine to resume sensor cleaning of the one or more sensors 100 based on a touch applied to the ninth graphic object 720. For example, in response to a touch being applied to the ninth graphic object 720, the control unit 150 may be configured to resume the sensor cleaning.

The control unit 150 may be configured to control to render second information on sensor cleaning to be provided externally (e.g., to a person outside of the vehicle 10). For example, the control unit 150 may be configured to control the second display unit 134 to output a screen conveying second information on sensor cleaning. As another example, the control unit 150 may be configured to control the second sound output unit 136 to output a voice or an alarm sound conveying second information on sensor cleaning. Here, the second information on sensor cleaning may include a message indicating that sensor cleaning is scheduled to begin.

Figure 8:
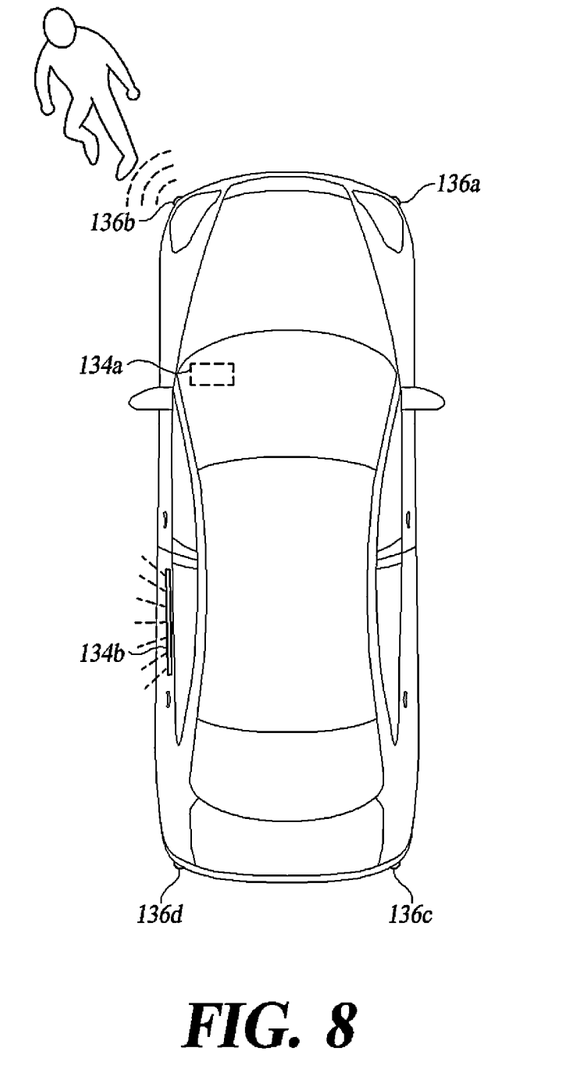
FIG. 8 is a diagram illustrating a method of providing information on sensor cleaning externally (e.g., to a person outside of a vehicle) according to at least one embodiment of the present disclosure.

FIG. 8 is a diagram illustrating a method of providing information on sensor cleaning externally (e.g., to a person outside of a vehicle), according to at least one embodiment of the present disclosure.

As shown in FIG. 8, the control unit 150 may be configured to convert the second information on sensor cleaning into text or image and output the textualized or imaged information at the windshield display 134a and/or the LED strip 134b. For example, the windshield display 134a and/or the LED strip 134b may output text such as 'sensor cleaning scheduled (5s)'.

The control unit 150 may be configured to warn the pedestrian that the sensor cleaning will launch by using the LED strip 134b. For example, the control unit 150 may be configured to control the LED strip 134b to blink orange and/or red light.

The control unit 150 may be configured to control the speakers 136a to 136d disposed outside the vehicle 10 to output a voice or an alarm sound conveying the second information for sensor cleaning. For example, the speakers 136a to 136d may voice 'sensor cleaning scheduled, splashing washer fluid coming up' or provide other audio guidance. The control unit 150 may be configured to control, among the plurality of speakers 136a to 136d, the speaker 136b corresponding to the direction in which the pedestrian is detected to output the voice guidance. According to some embodiments, the control unit 150 may be configured to control the output of the voice guidance in a direction in which a pedestrian is detected by using a directional speaker.

The storage 160 may be configured to store various programs and data related to sensor cleaning according to embodiments of the present disclosure. For example, the storage 160 may be configured to store one or more commands for the operation of the control unit 150 and may also store data inputted/outputted to the control unit 150.

Figure 9:
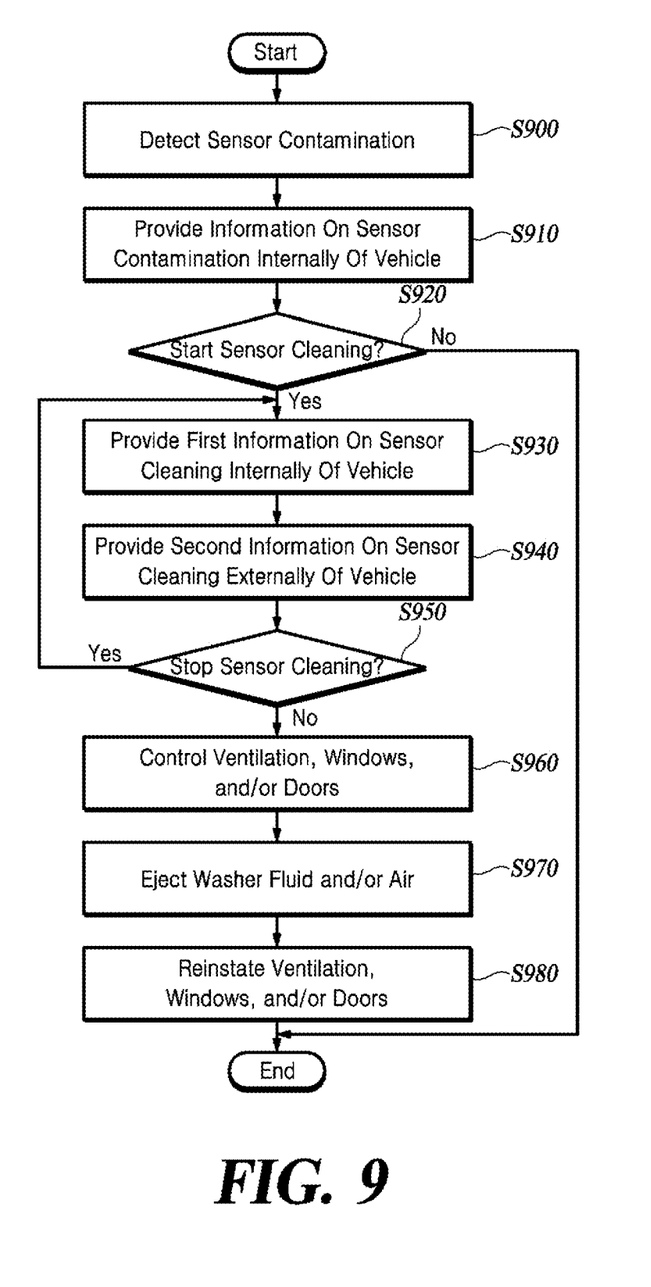
FIG. 9 is a flowchart of a method of operating a sensor cleaning management device according to at least one embodiment of the present disclosure.

FIG. 9 is a flowchart of a method of operating a sensor cleaning management device, according to at least one embodiment of the present disclosure.

Since the method shown in FIG. 9 may be performed by the sensor cleaning management device described above in FIGS. 1-8 or a vehicle 10 equipped with the same, a reiterative description thereof description has been omitted.

The sensor cleaning management device may detect the contamination degree of one or more sensors 100 (S900).

The sensor cleaning management device may provide information on the contamination degree of the one or more sensors 100 internally (e.g., to an occupant inside of the vehicle 10) (S910). The sensor cleaning management device may control the internal HMI unit 120 to output information on the contamination degree of one or more sensors 100.

The sensor cleaning management device may determine whether to initiate sensor cleaning for one or more sensors 100 (S920).

In at least one embodiment, the sensor cleaning management device may receive a sensor cleaning initiation command from an occupant inside the vehicle as a response to the information on the contamination degree. To this end, the internal HMI unit 120 may provide the occupant with a GUI containing information on the degree of contamination of the one or more sensors 100 and a button for inputting a sensor cleaning initiation command In another embodiment, the sensor cleaning management device may determine whether to initiate sensor cleaning based on the contamination degree of the respective sensors 100. The sensor cleaning management device may determine that sensor cleaning is initiated when the contamination degree of at least a preset number of the sensors 100 is equal to or greater than a preset threshold. For example, the sensor cleaning management device may determine to initiate sensor cleaning when there are two or more of the sensors 100 classified as 'unsafe' by the degree of contamination.

When the sensor cleaning management device determines that the sensor cleaning for one or more sensors 100 is initiated (Yes in S920), the sensor cleaning management device may provide a first information on sensor cleaning internally (e.g., to an occupant inside of the vehicle) (S930). Here, the first information on the sensor cleaning may include a message indicating that the sensor cleaning is scheduled to begin.

The sensor cleaning management device may provide a second information on sensor cleaning externally (e.g., to a person outside of the vehicle (S940). Here, the second information on sensor cleaning may include a message indicating that sensor cleaning is scheduled to begin.

The sensor cleaning management device determines whether to stop cleaning the sensor (S950).

In at least one embodiment, the sensor cleaning management device may receive a command to stop sensor cleaning from an occupant of the vehicle 10 as a response to the first information. To this end, the internal HMI unit 120 may provide the occupant with a GUI including a message indicating that sensor cleaning is scheduled to begin and a button for inputting a command to stop sensor cleaning.

In another embodiment, the sensor cleaning management device may detect whether a pedestrian exists outside the vehicle 10. In response to detecting the presence of a pedestrian outside the vehicle 10, the sensor cleaning management device may determine to stop sensor cleaning. In this case, the first information on the sensor cleaning may include a message indicating that the sensor cleaning is stopped. The sensor cleaning management device may receive a command to resume sensor cleaning from an occupant of the vehicle 10 as a response to the first information. To this end, the internal HMI unit 120 may provide the occupant with a GUI including a message informing that the sensor cleaning is stopped for a pedestrian detected outside the vehicle and a button for inputting a command to resume sensor cleaning. The sensor cleaning management device may control the sensor cleaning to be stopped or resumed based on the occupant's response to the first information.

In response to determining that sensor cleaning is not stopped, i.e., in response to determining that sensor cleaning be initiated (No in S950), the sensor cleaning management device may control at least one of a ventilation mode, window operation, and/or door operation of the vehicle 10 (S960). For example, the sensor cleaning management device may control the ventilation mode of the vehicle 10 to be switched to the recirculation mode. As another example, the sensor cleaning management device may control one or more windows to be closed. As yet another example, the sensor cleaning management device may control one or more doors to be locked. In this case, the first information on sensor cleaning provided internally (e.g., to an occupant inside of the vehicle 10) may include a message indicating that at least one of the ventilation mode, the windows, and/or the doors of the vehicle is controlled.

Next, the sensor cleaning management device may control the cleaning unit 110 to eject the washer fluid and/or air toward one or more sensors 100 (S970).

Then, the sensor cleaning management device may control at least one of the ventilation mode, the windows, and/or the doors to return to the original state (S980).

Meanwhile, in response to determining that sensor cleaning is to be stopped (Yes in S950), the sensor cleaning management device may resume sensor cleaning after a preset time. In this case, the first information about sensor cleaning provided internally (e.g., to an occupant inside of the vehicle 10) may include a message indicating that sensor cleaning is resumed after a preset time.

As described above, according to at least one embodiment of the present disclosure, before or during sensor cleaning, a message informing the launch of sensor cleaning may be provided internally (e.g., to an occupant inside of the vehicle 10) and/or externally (e.g., to a person outside of the vehicle 10). Thus, occupants and/or pedestrians can be properly alerted in advance, while the ventilation mode, windows, and/or doors of the vehicle 10 can be automatically controlled to prevent the interior of the vehicle 10 from the intrusion of fluids and odors.

Additionally, according to at least one embodiment, the present disclosure can be responsive to an unsuitable external environment of the vehicle to perform sensor cleaning for stopping the sensor cleaning or providing the occupant with a GUI to enter an abort command The respective components of the device or method according to the present disclosure may be implemented as hardware or software, or hardware and software combined. Additionally, the function of each component may be implemented by software and the function by software for each component may be implemented to be executed by a microprocessor.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Although the flowchart(s) or timing chart(s) of the present disclosure presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by the flowchart(s) or timing chart(s) or by performing one or more of the steps thereof in parallel, and hence the steps in the flowchart(s) or timing chart(s) are not limited to the illustrated chronological sequences.

As described above, according to some embodiments, the present disclosure can keep, before or during a sensor cleaning process, the occupants and/or pedestrians informed with a message provided internally (e.g., to an occupant inside of the vehicle) and/or externally (e.g., to a person outside of the vehicle). Accordingly, the present disclosure can prevent a conflict from happening with an external pedestrian in the sensor cleaning process. As used above and in the claims below, providing information or a message internally to an occupant or externally to a persons does not necessarily mean that there must be an occupant in the vehicle or a person outside the vehicle. This only means that the message or information is presented in a manner that is visible, accessible, receivable, or the like by or to such an occupant or person.

Furthermore, according to another embodiment, the present disclosure can control, before or during a sensor cleaning process, a ventilation mode of the vehicle, a window operation, and/or a door operation and thus can prevent washer fluid, foreign matters, odors, and/or noise, etc. from being introduced into the vehicle.

Furthermore, according to yet another embodiment, the present disclosure can enable the occupant to monitor the contamination degree of the sensor in real-time and thus can secure the occupant's confidence in the vehicle.

Furthermore, according to yet another embodiment, the present disclosure can stop the sensor cleaning responsive to an emergency and thus can tackle the same sensitively and effectively.

The effects of the present disclosure are not limited to those particularly described hereinabove and other unmentioned effects that the present disclosure gives should be clearly understood by those having ordinary skill in the art from the above detailed description.

Although embodiments of the present disclosure have been described for illustrative purposes, those having ordinary skill in the art should appreciate that various modifications, additions, and substitutions are possible, without departing from the idea and scope of the claimed invention. Therefore, embodiments of the present disclosure have been described for the sake of brevity and clarity. The scope of the technical idea of the embodiments of the present disclosure is not limited by the illustrations. Accordingly, one of ordinary skill should understand the scope of the claimed invention is not to be limited by the above explicitly described embodiments but by the claims and equivalents thereof.

| REFERENCE NUMERALS | |
|---|---|
| 10: vehicle | 100: sensor |
| 110: cleaning unit | 120: internal HMI unit |
| 122: input unit | 124: first display unit |
| 126: first sound output unit | 130: external HMI unit |
| 134: second display unit | 136: second sound output unit |
| 140: driving unit | 142: air-conditioner driving unit |
| 144: window driving unit | 146: door driving unit |
| 150: control unit | 160: storage |

What is claimed is:

1. A method, performed by a device of a vehicle, for sensor cleaning management, the method comprising:
   determining whether to initiate sensor cleaning;
   providing first information on the sensor cleaning to an occupant inside of the vehicle;
   providing second information on the sensor cleaning to a person outside of the vehicle, wherein the providing of the second information includes providing the second information visually and/or audibly from the vehicle toward an outside of the vehicle; and
   determining, by a sensor cleaning management device, to stop the sensor cleaning in response to a detection of a pedestrian present outside the vehicle by the sensor cleaning management device.

2. The method of claim 1, further comprising:
   controlling at least one of a ventilation mode, a window, and a door of the vehicle in response to determining to initiate the sensor cleaning.

3. The method of claim 2, wherein the first information on the sensor cleaning comprises:
   a message informing that at least one of the ventilation mode, the window, and the door of the vehicle is controlled.

4. The method of claim 2, wherein the controlling comprises:
   controlling the ventilation mode of the vehicle to be switched to a recirculation mode in response to determining to initiate the sensor cleaning.

5. The method of claim 2, wherein the controlling comprises:
   controlling the window of the vehicle to be closed in response to determining to initiate the sensor cleaning.

6. The method of claim 2, wherein the controlling comprises:
   controlling the door of the vehicle to be locked in response to determining to initiate the sensor cleaning.

7. The method of claim 1, wherein the first information and the second information on the sensor cleaning each comprises:
   a message informing that the sensor cleaning is scheduled to begin.

8. The method of claim 1, wherein the determining of whether to initiate sensor cleaning comprises:
   detecting a contamination degree of at least one or more sensors; and
   providing information on the contamination degree of the at least one or more sensors to the occupant inside of the vehicle.

9. The method of claim 8, wherein the determining of whether to initiate sensor cleaning comprises:
   receiving a sensor cleaning initiation command for the at least one or more sensors from an occupant inside the vehicle as a response to the information on the contamination degree.

10. The method of claim 8, wherein the determining of whether to initiate sensor cleaning comprises:
    determining to initiate the sensor cleaning when a preset number or more of the at least one or more sensors have a contamination degree equal to or greater than a preset threshold.

11. The method of claim 1, further comprising:
    detecting whether a pedestrian is present outside the vehicle.

12. The method of claim 11, wherein the first information on the sensor cleaning comprises:
    a message informing that a pedestrian is present outside the vehicle.

13. The method of claim 11, further comprising:
    receiving a command to stop or resume the sensor cleaning from an occupant inside the vehicle as a response to the first information.

14. A device for sensor cleaning management, the device comprising a control unit configured
    to determine whether to initiate sensor cleaning,
    to provide first information on the sensor cleaning to an occupant inside of a vehicle,
    to provide second information on the sensor cleaning to a person outside of the vehicle, wherein the control unit provides the second information visually and/or audibly from the vehicle toward an outside of the vehicle, and
    to determine to stop the sensor cleaning in response to a detection of a pedestrian present outside the vehicle.

15. A vehicle, comprising:
    at least one or more sensors;
    a cleaning unit configured to eject at least one of washer fluid or air toward the one or more sensors;
    a control unit configured to determine whether to initiate the sensor cleaning by the cleaning unit;
    an internal Human Machine Interface (HMI) unit configured to provide first information on the sensor cleaning to an occupant inside of the vehicle;
    an external HMI unit configured to provide second information on the sensor cleaning to a person outside of the vehicle, wherein the external HMI unit provides the second information visually and/or audibly from the vehicle toward an outside of the vehicle; and
    a sensor cleaning management device configured to determine to stop the sensor cleaning in response to a detection, by the sensor cleaning management device, of a pedestrian present outside the vehicle.

16. The method of claim 1, wherein the providing of the second information comprises:
warning a pedestrian around the vehicle that the sensor cleaning is to be performed.

17. The method of claim 1, wherein the providing of the second information comprises:
displaying the second information toward a road surface around the vehicle.

18. The method of claim 1, wherein the providing of the second information comprises:
displaying the second information using a display disposed on a body of the vehicle.

19. The method of claim 1, wherein the providing of the second information comprises:
controlling a speaker disposed on an exterior of the vehicle to output a voice or an alarm sound conveying the second information.

20. The method of claim 11, wherein the providing of the second information comprises:
providing the second information toward a direction in which the pedestrian is detected.

* * * * *